No. 646,048. Patented Mar. 27, 1900.
DON SERAFINO DONZELLA.
PRUNING IMPLEMENT.
(Application filed Sept. 16, 1898.)
(No Model.)
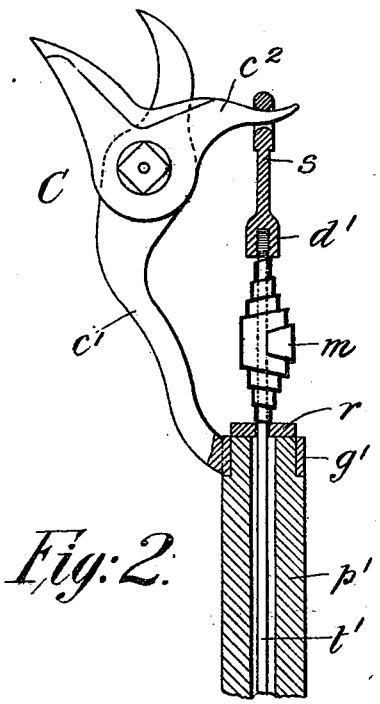
Fig. 2.
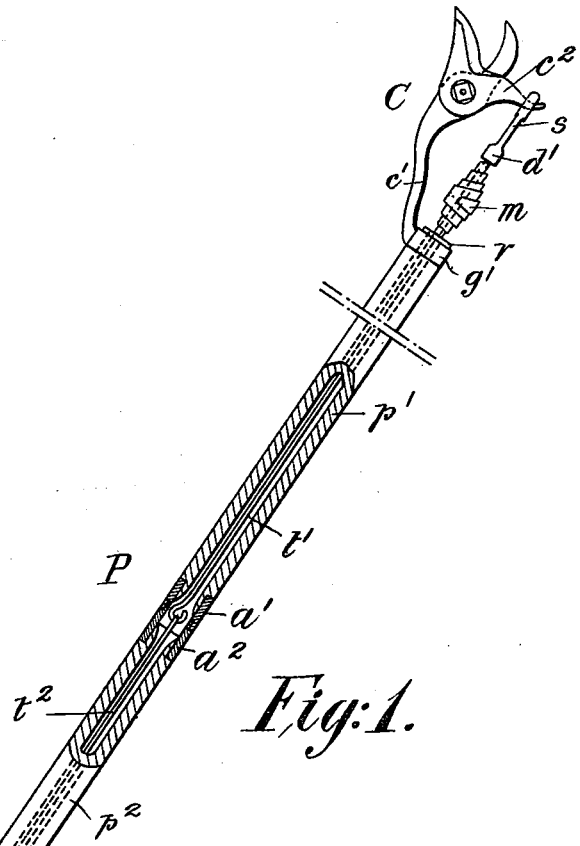
Fig. 1.
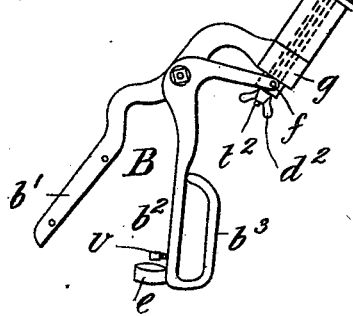
Witnesses
Edwin O. Bartlett
Frank J. Ames
Inventor
Don Serafino Donzella
per Herbert Sefton Jones
Attorney

UNITED STATES PATENT OFFICE.

DON SERAFINO DONZELLA, OF DOGLIANI, ITALY.

PRUNING IMPLEMENT.

SPECIFICATION forming part of Letters Patent No. 646,048, dated March 27, 1900.

Application filed September 16, 1898. Serial No. 691,120. (No model.)

*To all whom it may concern:*

Be it known that I, DON SERAFINO DONZELLA, a subject of the King of Italy, and a resident of Dogliani, (Cuneo,) in the Province of Piedmont, Italy, have invented a new and useful Improvement in Pruning Implements, of which the following is a specification.

My improvement relates to an improvement in the ordinary hand-pruning shears mounted upon a pole or shaft, having the shears at the top of the said shaft. It is designed to render these shears more certain and convenient in operation and avoid the use of a cord in connection therewith, which cord is liable to break.

I will describe my invention with reference to the accompanying drawings.

Figure 1 is a side elevation, partly in section, of the shears complete. Fig. 2 is a side view, partly sectional, of the shears drawn to a larger scale.

The fixed member $c'$ of the shears C has its lower end terminating in a ferrule $g'$, by means of which the shears C are secured to the upper end $p'$ of a tubular rod P. This tubular rod P may, however, consist of a single length or preferably of several lengths, (in the drawings two such lengths $p'$ $p^2$ are shown) united by the threaded ferrules $a'$ $a^2$ or by bayonet-joints or other convenient methods. Consequently the tool can be divided into several pieces, each of relatively-small size and conveniently portable.

The movable member $c^2$ of the shears C has its lower end bent to engage in a link $s$. The link $s$ is connected at $d'$ to a rod $t'$, the upper end of which is encircled by a spring $m$ and its lower end connected to a second length of rod $t^2$. The spring $m$ is of shape and strength suitable to the size of the apparatus and is coiled around the upper part of the rod $t'$ and prolonged above the head of the tubular rod $p'$ and retained between the enlarged connection $d'$ and a collar $r$, which rests upon the end of the tubular rod $p'$ and is held there by the spring $m$, the hole in the collar $r$ being just sufficiently large to allow of the free movement of the rod $t'$. The said spring is formed, preferably, of a steel band coiled spirally. This band may be single or preferably, when the apparatus is large, it may be formed double of a coiled plate of V shape. This latter construction of the spring is that shown in the drawings. The spring instead of being placed outside, as shown, may equally well be concealed in the tubular rod but I prefer an outside spring for convenience of manipulation and repair.

Each length of the tubular rod has a corresponding length of internal rod, $t'$ $t^2$, &c., and the connection of each piece of the rods $t'$ and $t^2$ with the following piece may be effected by means of hooks at their ends. The spring $m$, being slightly compressed, prevents these hooks from becoming uncoupled.

The lower end of the tubular rod $p^2$ is provided with a ferrule $g$ in one piece with the fixed member $b'$ of the operating-handle B. The movable member $b^2$ possesses a guard $b^3$ and a stop-screw $v$, which when the handle is operated abuts against the fixed member $b'$. In order to retain the handle B closed, I provide a small flexible ring $e$, made, for instance, of a piece of leather secured by a screw to the movable part $b^2$ of the handle B. The lower length of the rod $t^2$ is prolonged a little beyond the end of the tubular rod $p^2$ and passes through a ring which moves upon two pivots at the end of the fork $f$, forming the end of the movable member $b^2$, the said ring bearing against the wing-nut $d^2$.

The operation of the apparatus is as follows: When the tubular segmental rod is long, and consequently heavy, it is upheld by grasping the tubular rod P with one hand while the other hand operates the shears C by the operating-handle B. If, on the contrary, the apparatus is short and light, the hands applied to the handle will suffice to uphold it. When the movable member $b^2$ of the handle is pressed toward the fixed member $b'$, the forked end $f$ depresses the nuts $d^2$ and draws down the rods $t'$ $t^2$ and link $s$. By this means the movable member $c^2$ of the shears is also drawn down, causing the blades to meet. When the operating-handle B is opened, the spring $m$ returns the movable parts to their original position and the shears consequently open again.

The tubular rod P is preferably of wood, but it can also be made of iron or brass tubing or other suitable material. The other parts are preferably of metal, as in the ordinary apparatus.

What I claim is—

In a pruning apparatus the combination of the screw-coupled tubular rods $p'$, $p^2$, the linked rods $t'$, $t^2$, the handle B, the spring $m$, the shears C and the connecting-link $s$, substantially as described.

In testimony that I claim the foregoing as my invention I have signed my name, in presence of two witnesses, this 31st day of May, 1898.

DON SERAFINO DONZELLA.

Witnesses:
PERCY MCELRATH,
ALBERTA PERY.